(12) United States Patent
Chen

(10) Patent No.: US 11,354,466 B1
(45) Date of Patent: Jun. 7, 2022

(54) MACHINE LEARNING FOR ADDITIVE MANUFACTURING

(71) Applicant: Inkbit, LLC, Medford, MA (US)

(72) Inventor: Desai Chen, Arlington, MA (US)

(73) Assignee: Inkbit, LLC, Medford, MA (US)

( * ) Notice: Subject to any disclaimer, the term of this patent is extended or adjusted under 35 U.S.C. 154(b) by 0 days.

(21) Appl. No.: 17/560,455

(22) Filed: Dec. 23, 2021

Related U.S. Application Data

(63) Continuation-in-part of application No. 17/014,344, filed on Sep. 8, 2020, which is a continuation of application No. 16/672,711, filed on Nov. 4, 2019, now Pat. No. 10,769,324.

(60) Provisional application No. 62/754,770, filed on Nov. 2, 2018.

(51) Int. Cl.
*G06F 30/20* (2020.01)
*B29C 64/393* (2017.01)
*G06N 20/00* (2019.01)
*G06N 3/08* (2006.01)
*B33Y 50/02* (2015.01)
*G06F 119/18* (2020.01)

(52) U.S. Cl.
CPC ........... *G06F 30/20* (2020.01); *B29C 64/393* (2017.08); *G06N 3/08* (2013.01); *G06N 20/00* (2019.01); *B33Y 50/02* (2014.12); *G06F 2119/18* (2020.01)

(58) Field of Classification Search
CPC .... G06F 3/1236; G06F 3/1203; G06F 3/1229; G06F 3/1285; G06F 30/20; G06F 2119/18; H04N 2201/0094; B29C 64/393; B29C 64/209; B33Y 70/00; B33Y 10/00; B33Y 50/02; G06N 3/08; G06N 20/00
See application file for complete search history.

(56) References Cited

U.S. PATENT DOCUMENTS

| | | | |
|---|---|---|---|
| 5,460,758 | A | 10/1995 | Langer et al. |
| 6,492,651 | B2 | 12/2002 | Kerekes |
| 8,237,788 | B2 | 8/2012 | Cooper et al. |

(Continued)

FOREIGN PATENT DOCUMENTS

| | | |
|---|---|---|
| EP | 2186625 B1 | 12/2016 |
| EP | 3459716 A1 | 3/2019 |

(Continued)

OTHER PUBLICATIONS

Blanken, Lennart, Robin de Rozario, Jurgen van Zundert, Sjirk Koekebakker, Maarten Steinbuch, and Tom Oomen. "Advanced feedforward and learning control for mechatronic systems." In Proc. 3rd DSPE Conf. Prec. Mech, pp. 79-86. 2016.

(Continued)

*Primary Examiner* — Kidest Bahta
(74) *Attorney, Agent, or Firm* — Occhiuti & Rohlicek LLP

(57) ABSTRACT

An approach to intelligent additive manufacturing makes use of one or more of machine learning, feedback using machine vision, and determination of machine state. In some examples, a machine learning transformation receives data representing a partially fabricated object and a model of an additional part (e.g., layer) of the part, and produces a modified model that is provided to a printer. The machine learning predistorter can compensate for imperfections in the partially fabricated object as well as non-ideal characteristics of the printer, thereby achieving high accuracy.

20 Claims, 3 Drawing Sheets

(56) References Cited

U.S. PATENT DOCUMENTS

| | | | |
|---|---|---|---|
| 9,259,931 B2 | 2/2016 | Moreau et al. |
| 9,562,759 B2 | 2/2017 | Vogler et al. |
| 9,697,604 B2 | 7/2017 | Wang et al. |
| 9,952,506 B2 | 4/2018 | Arai et al. |
| 10,011,071 B2 | 7/2018 | Batchelder |
| 10,252,466 B2 | 4/2019 | Ramos et al. |
| 10,456,984 B2 | 10/2019 | Matusik et al. |
| 10,725,446 B2 | 7/2020 | Mercelis |
| 2002/0104973 A1 | 8/2002 | Kerekes |
| 2004/0085416 A1 | 5/2004 | Kent |
| 2004/0114002 A1 | 6/2004 | Kosugi et al. |
| 2004/0173946 A1 | 9/2004 | Pfeifer et al. |
| 2006/0007254 A1 | 1/2006 | Tanno et al. |
| 2007/0106172 A1 | 5/2007 | Abreu |
| 2007/0241482 A1 | 10/2007 | Giller et al. |
| 2008/0124475 A1 | 5/2008 | Kritchman |
| 2009/0073407 A1 | 3/2009 | Okita |
| 2009/0105605 A1 | 4/2009 | Abreu |
| 2009/0220895 A1 | 9/2009 | Garza et al. |
| 2009/0279089 A1 | 11/2009 | Wang |
| 2009/0279098 A1 | 11/2009 | Ohbayashi et al. |
| 2010/0140550 A1 | 6/2010 | Keller et al. |
| 2010/0158332 A1 | 6/2010 | Rico et al. |
| 2012/0275148 A1 | 11/2012 | Yeh et al. |
| 2013/0182260 A1 | 7/2013 | Bonnema et al. |
| 2013/0328227 A1 | 12/2013 | McKinnon et al. |
| 2014/0249663 A1 | 9/2014 | Voillaume |
| 2014/0300676 A1 | 10/2014 | Miller et al. |
| 2014/0328963 A1 | 11/2014 | Mark et al. |
| 2015/0061178 A1 | 3/2015 | Siniscalchi et al. |
| 2015/0101134 A1 | 4/2015 | Manz et al. |
| 2015/0124019 A1 | 5/2015 | Cruz-Uribe et al. |
| 2015/0352792 A1 | 12/2015 | Kanada |
| 2016/0018404 A1 | 1/2016 | Iyer et al. |
| 2016/0023403 A1 | 1/2016 | Ramos et al. |
| 2016/0101568 A1 | 4/2016 | Mizes et al. |
| 2016/0157751 A1 | 6/2016 | Mahfouz |
| 2016/0167301 A1 | 6/2016 | Cole et al. |
| 2016/0185044 A1 | 6/2016 | Leonard et al. |
| 2016/0209319 A1 | 7/2016 | Adalsteinsson et al. |
| 2016/0249836 A1 | 9/2016 | Gulati et al. |
| 2016/0320771 A1 | 11/2016 | Huang |
| 2016/0347005 A1 | 12/2016 | Miller |
| 2017/0021455 A1 | 1/2017 | Dallarosa et al. |
| 2017/0050374 A1* | 2/2017 | Minardi ................ B33Y 10/00 |
| 2017/0078524 A1 | 3/2017 | Tajima et al. |
| 2017/0087766 A1 | 3/2017 | Chung et al. |
| 2017/0106604 A1 | 4/2017 | Dikovsky et al. |
| 2017/0120337 A1 | 5/2017 | Kanko et al. |
| 2017/0143494 A1 | 5/2017 | Mahfouz |
| 2017/0217103 A1 | 8/2017 | Babaei et al. |
| 2017/0235293 A1 | 8/2017 | Shapiro et al. |
| 2017/0355147 A1 | 12/2017 | Buller et al. |
| 2017/0372480 A1* | 12/2017 | Anand .................... G06T 19/20 |
| 2018/0017501 A1 | 1/2018 | Trenholm et al. |
| 2018/0036964 A1 | 2/2018 | DehghanNiri et al. |
| 2018/0056288 A1 | 3/2018 | Abate et al. |
| 2018/0056582 A1 | 3/2018 | Matusik et al. |
| 2018/0071984 A1 | 3/2018 | Lee et al. |
| 2018/0095450 A1 | 4/2018 | Lappas et al. |
| 2018/0099333 A1 | 4/2018 | DehghanNiri et al. |
| 2018/0143147 A1 | 5/2018 | Milner et al. |
| 2018/0154580 A1 | 6/2018 | Mark |
| 2018/0169953 A1 | 6/2018 | Matusik et al. |
| 2018/0194066 A1 | 7/2018 | Ramos et al. |
| 2018/0273657 A1 | 9/2018 | Wang et al. |
| 2018/0275636 A1* | 9/2018 | Zhao .................... B29C 64/386 |
| 2018/0281067 A1 | 10/2018 | Small et al. |
| 2018/0297113 A1 | 10/2018 | Preston et al. |
| 2018/0304549 A1 | 10/2018 | Safai et al. |
| 2018/0311893 A1 | 11/2018 | Choi et al. |
| 2018/0320006 A1 | 11/2018 | Lee et al. |
| 2018/0341248 A1 | 11/2018 | Mehr et al. |
| 2018/0348492 A1 | 12/2018 | Pavlov et al. |
| 2019/0056717 A1 | 2/2019 | Kothari et al. |
| 2019/0077921 A1 | 3/2019 | Eckel |
| 2019/0118300 A1 | 4/2019 | Penny et al. |
| 2019/0270254 A1 | 9/2019 | Mark et al. |
| 2019/0271966 A1 | 9/2019 | Coffman et al. |
| 2019/0322031 A1 | 10/2019 | Kritchman |
| 2019/0329322 A1 | 10/2019 | Preston et al. |
| 2019/0346830 A1 | 11/2019 | de Souza Borges Ferreira et al. |
| 2019/0353767 A1 | 11/2019 | Eberspach et al. |
| 2020/0004225 A1 | 1/2020 | Buller et al. |
| 2020/0122388 A1 | 4/2020 | Van Esbroeck et al. |
| 2020/0143006 A1 | 5/2020 | Matusik et al. |
| 2020/0147888 A1 | 5/2020 | Ramos et al. |
| 2020/0215761 A1 | 7/2020 | Chen et al. |
| 2020/0223143 A1 | 7/2020 | Gurdiel Gonzalez et al. |

FOREIGN PATENT DOCUMENTS

| | | | |
|---|---|---|---|
| EP | 3527352 A1 | 8/2019 |
| JP | 2014098555 A | 5/2014 |
| JP | 6220476 B1 | 10/2017 |
| JP | 2018103488 A | 7/2018 |
| KR | 101567281 B1 | 11/2015 |
| KR | 20180067961 A | 6/2018 |
| WO | 98/45141 A2 | 10/1998 |
| WO | 2003/026876 A2 | 4/2003 |
| WO | 2017066077 A1 | 4/2017 |
| WO | 2018080397 A1 | 5/2018 |
| WO | 2018197376 A1 | 11/2018 |
| WO | 2018209438 A1 | 11/2018 |
| WO | 2019070644 A2 | 4/2019 |
| WO | 2019125970 A1 | 6/2019 |
| WO | 2020123479 A1 | 6/2020 |
| WO | 2020/146490 A1 | 7/2020 |
| WO | 2020145982 A1 | 7/2020 |

OTHER PUBLICATIONS

Blanken, Lennart "Learning and repetitive control for complex systems: with application to large format printers." (2019).

Oomen, Tom. "Advanced motion control for next-generation precision mechatronics: Challenges for control, identification, and learning." In IEEJ International Workshop on Sensing, Actuation, Motion Control, and Optimization (SAMCON), pp. 1-12. 2017.

Wieser, Wolfgang, Benjamin R. Biedermann, Thomas Klein, Christoph M. Eigenwillig, and Robert Huber. "Multi-megahertz OCT: High quality 3D imaging at 20 million A-scans and 4.5 GVoxels per second." Optics express 18, No. 14 (2010): 14685-14704.

Huo, Tiancheng, Chengming Wang, Xiao Zhang, Tianyuan Chen, Wenchao Liao, Wenxin Zhang, Shengnan Ai, Jui-Cheng Hsieh, and Ping Xue. "Ultrahigh-speed optical coherence tomography utilizing all-optical 40 MHz swept-source." Journal of biomedical optics 20, No. 3 (2015): 030503.

Klein, Thomas, and Robert Huber "High-speed OCT light sources and systems " Biomedical optics express 8, No. 2 (2017): 828-859.

Xu, Jingjiang, Xiaoming Wei, Luoqin Yu, Chi Zhang, Jianbing Xu, K. K. Y. Wong, and Kevin K. Tsia. "Performance of megahertz amplified optical time-stretch optical coherence tomography (AOT-OCT)." Optics express 22, No. 19 (2014): 22498-22512.

Park, Yongwoo, Tae-Jung Ahn, Jean-Claude Kieffer, and José Azaña. "Optical frequency domain reflectometry based on real-time Fourier transformation." Optics express 15, No. 8 (2007): 4597-4616.

Moon, Sucbei, and Dug Young Kim. "Ultra-high-speed optical coherence tomography with a stretched pulse supercontinuum source." Optics Express 14, No. 24 (2006): 11575-11584.

Zhou, Chao, Aneesh Alex, Janarthanan Rasakanthan, and Yutao Ma. "Space-division multiplexing optical coherence tomography." Optics express 21, No. 16 (2013): 19219-19227.

Alarousu, Erkki, Ahmed AlSaggaf, and Ghassan E. Jabbour. "Online monitoring of printed electronics by spectral-domain optical coherence tomography." Scientific reports 3 (2013): 1562.

Fischer, Björn, Christian Wolf, and Thomas Härtling. "Large field optical tomography system." In Smart Sensor Phenomena, Technology, Networks, and Systems Integration 2013, vol. 8693, p. 86930P. International Society for Optics and Photonics, 2013.

(56) References Cited

OTHER PUBLICATIONS

Daniel Markl et al: "In-line quality control of moving objects by means of spectral-domain OCT", Optics and Lasers in Engineering, vol. 59, Aug. 1, 2014 (Aug. 1, 2014), pp. 1-10, XP055671920, Amsterdam, NL ISSN: 0143-8166, DOI: 10.1016/j.optlaseng.2014. 02.008.

Daniel Markl et al: "Automated pharmaceutical tablet coating layer evaluation of optical coherence tomography images", Measurement Science and Technology, IOP, Bristol, GB, vol. 26, No. 3, Feb. 2, 2015 (Feb. 2, 2015), p. 35701, XP020281675, ISSN: 0957-0233, DOI: 10.1088/0957-0233/26/3/035701 [retrieved on Feb. 2, 2015].

Sitthi-Amorn, Pitchaya, Javier E. Ramos, Yuwang Wangy, Joyce Kwan, Justin Lan, Wenshou Wang, and Wojciech Matusik. "MultiFab: a machine vision assisted platform for multi-material 3D printing." ACM Transactions on Graphics (TOG) 34, No. 4 (2015): 129.

Kulik, Eduard A., and Patrick Calahan. "Laser profilometry of polymeric materials." Cells and Materials 7, No. 2 (1997): 3.

Qi, X.; Chen, G.; Li, Y.; Cheng, X.; and Li, C., "Applying Neural-Network Based Machine Learning to Addirive Manufacturing: Current Applications, Challenges, and Future Perspectives", Jul. 29, 2018, Engineering 5 (2019) 721-729. (Year: 2019).

DebRoy, T.; Wei, H.L.; Zuback, U.S.; Muhkerjee, T.; Elmer, J.W.; Milewski, J.O.; Beese, A.M.; Wilson-Heid, A.; Ded, A.; and Zhang, W., "Additive manufacturing of metallic components—Process, structure and properties", Jul. 3, 2017, Progress in Materials Science 92 (2018) 112-224. (Year: 2017).

Yu C, Jiang J. A Perspective on Using Machine Learning in 3D Bioprinting. Int J Bioprint. Jan. 24, 2020;6(1):253. doi: 10.18063/ijb v6i1.253.

Boh, G.D., Sing, S.L. & Yeong, W.Y. A review on machine learning in 3D printing: applications, potential, and challenges. Artif Intell Rev 54, 63-94 (2021). https://doi.org/10.1007/s10462-020-09876-9.

Optimal shape morphing control of 4D printed shape memory polymer based on reinforcement learning Robotics and Computer-Integrated Manufacturing (IF5.666), Pub Date : Jul. 17, 2021, DOI: 10.1016/j.rcim.2021.102209.

Zhao, Xiaozhou, Julia A. Bennell, Tolga Bekta?, and Kath Dowsland. "A comparative review of 3D container loading algorithms." International Transactions in Operational Research 23, No. 1-2 (2016): 287-320.

\* cited by examiner

MACHINE LEARNING FOR ADDITIVE MANUFACTURING

CROSS-REFERENCE TO RELATED APPLICATIONS

This application is a Continuation-in-Part (CIP) of U.S. application Ser. No. 17/014,344, filed Sep. 8, 2020, which is a Continuation of U.S. Pat. No. 10,769,324, issued on Sep. 8, 2020, and filed as application Ser. No. 16/672,711 on Nov. 4, 2019, which claims the benefit of U.S. Provisional Application No. 62/754,770, filed on Nov. 2, 2018. The contents of the aforementioned applications are hereby incorporated by reference in their entirety.

BACKGROUND

This invention relates to an intelligent additive manufacturing approach, and more particularly an approach that makes use of one or more of machine learning, feedback using machine vision, and determination of machine state.

Additive manufacturing (AM) is a set of methods that allows objects to be fabricated via selective addition of material. A typical additive manufacturing process works by slicing a digital model (for example, represented using an STL file) into a series of layers. Then the layers are sent to a fabrication apparatus that deposits the layers one by one from the bottom to the top. Additive manufacturing is rapidly gaining popularity in a variety of markets including automotive, aerospace, medical devices, pharmaceuticals, and industrial tooling.

The growth of additive manufacturing processes has led to various iterations of such processes being commercialized, including extrusion processes, such as fused deposition Modeling® (FDM®), light polymerization processes, such as stereolithography (SLA) and multijet/polyjet, powder bed fusion processes, such as selective laser sintering (SLS) or binder jetting, and lamination processes, such as laminated object manufacturing (LOM). Nevertheless, despite this growth and rapid progress, additive manufacturing has limitations, such as the materials that can be used in conjunction with such processes. There are limited types of materials, and the performance of the materials limits the efficiency and quality that results.

Inkjet 3D printing is a method of additive manufacturing where printheads deposit droplets of liquid ink. Printheads are typically mounted on a gantry system to allow deposition of ink in different locations within the build volume. The build platform may also move with respect to the printheads, which may be stationary. The liquid ink is solidified using UV or visible-light radiation.

Multiple printheads may be used in one system in order to build objects with multiple base materials. For example, materials that have different optical, mechanical, thermal, electromagnetic properties can be used. These materials can be combined to achieve composite materials with a wide range of material properties.

The UV curing unit is typically one of the subsystems used within an inkjet additive manufacturing apparatus. UV radiation provides the means of solidifying inks via photo-initiation of the polymerization reaction. UV radiation can be supplied by a variety of different mechanisms such as arrays of LEDs and Mercury or Xenon arc lamps. UV curing is typically applied after each layer is printed or after each material within a layer is deposited. The UV curing unit can be fixed with respect to the printer or it can move independently with respect to the object.

Alternatively, ink solidification can be achieved by changes in thermal conditions. For example, a liquid material solidifies as its temperature is lowered. A variety of different inks can be used in this category such as waxes. Both UV-phase change inks and thermal-phase change inks can be combined to manufacture an object.

Because of the slight variation of each drop and surface tension of inks, liquid layers deposited onto the platform are not perfectly flat, requiring a mechanical flattening device in order to eliminate the error and error accumulation caused by uneven layers. The flattening device may be a roller, script, or even mill, etc. Typically, about 20-30% of jetted material is removed during the flattening process, resulting in significant waste and increased material cost.

3D printed objects when manufactured using an inkjet process may need structural support. For example, most objects with overhangs need support structures. Typically, additional print data is generated for these support structures. In inkjet additive manufacturing, typically a separate ink is designated as a support material. This ink is deposited also using printheads and then it is solidified. It is desirable for the support material to be easily removed after the print is completed. There are many potential support materials including UV-curable materials that are soluble in water or other solvents or wax-based materials that can be removed by melting.

After the printing process is completed, parts are typically post-processed. For example, support material may need to be removed. The parts might also need to be post-processed to improve their mechanical or thermal properties. This may include thermal treatment and/or additional UV exposure.

In many cases inks may include additives. These additives include colorants in the form of dyes or pigments or the mixture of pigments and dyes that are dispersed or dissolved in the ink. Surfactants may also be used to adjust the surface tension of the ink for improved jetting or printing performance. In addition, other types of particles or additives may be used in order to enhance the mechanical, thermal or optical characteristics of the cured resin.

SUMMARY

Determining control inputs to a printer to yield a desired object may be informed by a model of the printing process and/or a policy that maps observations of the printing process to the control inputs. In some embodiments such a model and/or policy is updated during the printing process (e.g., during fabrication of one object, between fabrications of different objects, etc.) to maintain high accuracy by adapting to any changes that may not have been adequately incorporated into the control of the printing process earlier.

At least some embodiments make use of machine-learning techniques to implement the model of the printing process and/or the policy for the printing process. For example, artificial neural networks, which may be implemented in software and/or using custom or special-purpose hardware, may be used to implement the model and/or policy. The determination of control based on a model may make use of a planning approach, in which the effect of one or more printing steps (e.g., one or more added layers) is predicted and a search for the best next control of a printing step is determined.

Reinforcement Learning (RL) approaches may be used to determine control inputs (i.e., "actions") based on observations of the object being printed, for example, observations that are based on surface geometry and/or surface material of the partially-fabricated object. RL based techniques may use "simulated experience" that predicts printing results to improve a policy and possibly discover policies that are not typically implemented based on human input alone.

REMAINDER OF THE SUMMARY WILL BE COMPLETED TO CORRESPOND TO THE FINALIZED CLAIMS

Other features and advantages of the invention are apparent from the following description, and from the claims.

DESCRIPTION

1 Overview

A number of embodiments addressed in this document use various techniques in a feedback arrangement to yield accurate additive fabrication. In general, these embodiments are based on machine learning approaches. Some of the approaches described herein are introduced in U.S. Pat. No. 10,769,324, and some of those approaches are extended with additional techniques described herein. Yet other embodiments are introduced in this document.

Figure 1:
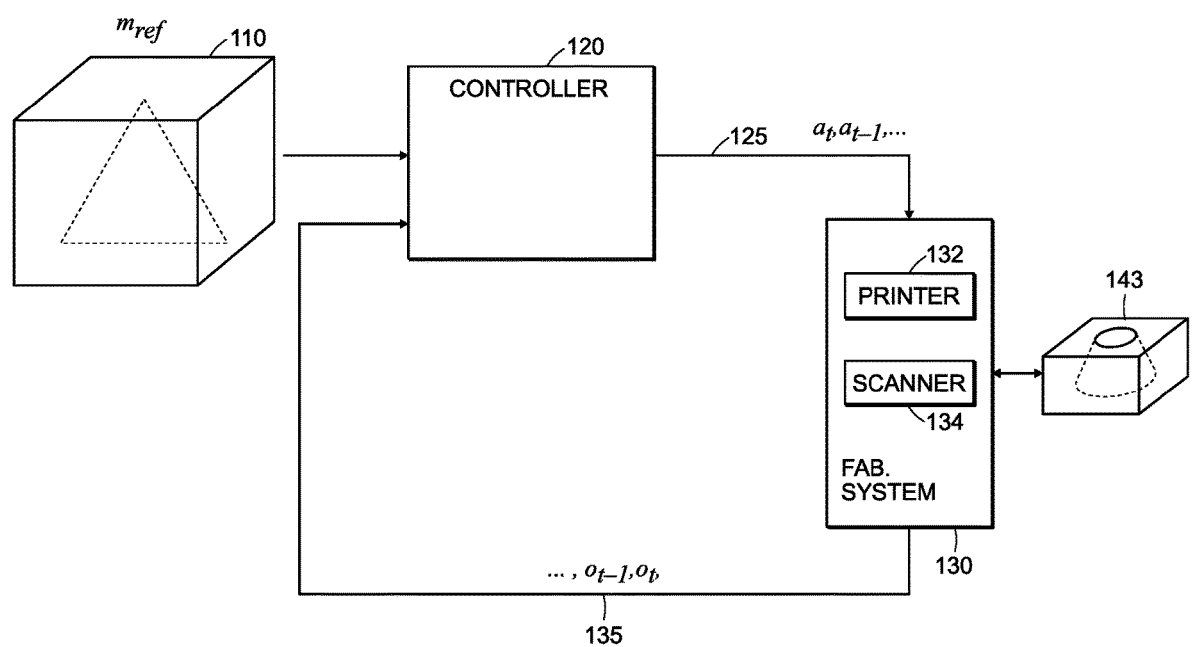
FIG. 1 is a block diagram of a feedback-based fabrication system.

Referring to FIG. 1, embodiment described below can be represented by a general framework in which an object (or more generally a set of objects) with a reference data representation (also referred to as a "model") $m^{ref}$ 110 is to be fabricated using an additive fabrication system 130 to yield a fabricated object 140. The system 130 includes a printer 132, which is controllable to deposit material to form the object, and a scanner 134, which provides feedback observations 135 regarding how the material has been deposited. The scanner feedback is fed back to a controller (also referred to as an "agent") 120, which processes the model 120 and the feedback 135 to select a next actions 125 to command the system 130 to incrementally add material to the partially fabricated object 140.

Very generally, the printing is performed in a series of increments, which in many of the embodiments correspond to thin layers that are successively deposited to ultimately form the object. In this incremental approach, the $t^{th}$ increment has a corresponding control input (also referred to as an "action") $a_t$ that is provided to the system by the controller. After acting on that control input, the system provides a next observation $o_{t+1}$ of the partially fabricated object that results from that action. Very generally, the controller makes use of the reference data and the history of the actions and observations to determine the next action to send to the system. The system in combination with the object being fabricated can be considered to be the system environment with which the agent interacts.

The machine learning techniques described herein are applicable to a variety of forms of printing approaches and corresponding control inputs, and sensing approaches and associated observations. The approaches are described below before describing the machine learning techniques that may be applied 1.1 Printer At least some embodiments make use of jetted additive fabrication in which material is deposited in thin layers, which cure or otherwise solidify sufficiently before subsequent layers are formed on top of them. Generally, there is at least one curable "build" material (e.g., a polymer) from which the ultimately desired object is formed, as well as an ultimately removable support material (e.g., a wax) that together form the object being fabricated. More generally, there may be multiple different build materials, and optionally curable materials that are ultimately removed, used to yield the desired object. Example systems for this type of fabrication are described in U.S. Pat. Nos. 10,252,466, 10,456,984, and 10,926,473, and U.S. application Ser. No. 17/197,581, filed 10 Mar. 2021, and Ser. No. 17/085,376, filed 30 Oct. 2020, each of which is incorporated herein by reference.

In at least some embodiments, the printer 132 is controllable to deposit material in particular locations on the object. For example, a set of jets pass continuously over the object, with each jet travelling in an x direction at a particular offset in a perpendicular y direction. Each jet is controllable to emit material at particular offsets in the x direction. In some examples, the x×y plane is divided into rectangular cells, and the control input for a layer to be deposited identifies which cells should have material emitted, and which cells should be omitted. That is, the control input can be represented as a 1-0 array of "on-off" indicators. Each material (e.g., support material and each build material) has a separate such array. In some embodiments, the amount of material that is desired to be emitted is specified in the control input, for example, rather than specifying an on-off input, for each material in each cell the control input affects the amount of material to be emitted using a discrete or continuous indicator. For example, the indicator may be a numerical value between 0.0 and 1.0 indicating the desired fractional amount of material that is desired to be emitted. Therefore, the control input in such examples has characteristics of a binary or continuous multichannel image (e.g., analogous to a color image).

In some embodiments, rather than an indicator directly representing the fractional amount of material that is desired to be emitted at each location, the indicator may represent a characteristic of control of the jet and only indirectly represents the amount of material to be emitted. In some examples, the jets are electrically controllable "drop-on-demand" jets, and each of the selectable characteristics have a corresponding electrical control (e.g., a control waveform). For example, in the case of such electrically excited piezoelectric jets, the characteristic of excitation may be a continuous quantity such as an amplitude of an excitation waveform, or timing of the waveform (e.g., rise time, dwell time, fall time), or may be a discrete quantity such as the number of excitation pulses, or may be an enumerated quantity to select from a set of pre-specified excitation waveforms.

In some examples, the locations of emissions along the path of a jet in the x direction is finely controllable, with the control input specifying the locations in the x direction where to emit material, not necessarily constrained to be on a grid on which the desired output is specified. As an example, the control input may be specified in an array that is more finely divided in the x direction than the input, possibly with a constraint on how frequently material may be emitted (i.e., repeated emissions at the fine scale may be prohibited or physically impossible.)

Note that in some embodiments, additional control inputs may be global to a layer being deposited, for example, representing a control value for a printhead such as a pressure, temperature, or parameter of a control waveform for the jets. Furthermore, a printer may have additional controllable components, such as a controllable cooling component as described in U.S. patent application Ser. No. 17/085,376, that has a set of controllable cooling elements disposed above the object being fabricated, for example, forming a linear cooling element (e.g., fans, ducts, etc.) extending in the y direction or a two-dimensional cooling element having a grid of such cooling elements. In such a case, the control input may include the degree of cooling to be applied at different locations on the surface of the object.

As may be appreciated, the emission of material to form the object has a wide variety of unpredictable aspects, including for example, the amount of material emitted, the trajectory toward the surface of the object being fabricated, the fluid properties (e.g., flow, mixing) when the material reaches the surface of the object, solidifying (e.g., curing, phase change, etc.) of the material. Furthermore, there may be systematic inaccuracies, for example, with a systemic error between a location where the printer is instructed to emit material, and the actual location where it is deposited. Therefore, as described below, the controller is designed to take into consideration such variability when determining a control input.

1.2 Scanning

A number of different sensing (also referred to as "scanning") approaches may be used to generate the observations of a partially fabricated object that are fed back to the controller. Generally, these observations provide dimensional information, material information, and/or thermal information as a function of location.

One form of such an observation is an array of height measurements of the object as a function of location cells or quantized locations in the x×y plane which may be represented as z(x,y). For example, the array has cells that have the same dimensions and locations as the cells of the control input, but such a direct correspondence is not required (e.g., there may be a greater resolution or a lower resolution as compared to the control input).

In some embodiments, the observation includes a characterization of the uncertainty of the measurement. For example, in the case of height measurements, an observation for a location may include both a height estimate or expected value (e.g., a mean $\bar{z}(x,y)$ of a probability distribution and an uncertainty (e.g., a variance or standard deviation $\sigma_z(x,y)$) for that measurement.

In some embodiments, each observation includes an array of material determinations. For example, in the case of two materials, each location may have associated with it a determination of which material is present in the top layer at that location, or may have an estimate of the fraction of or the probability that each material is present at that location. For example, techniques such as described in U.S. patent application Ser. No. 16/796,137 using material-dependent emissions from the surface of the partially fabricated object may be used to distinguish materials.

In some embodiments, each observation includes an array of thermal measurements, for example, providing the temperature as a function of location, for example, as described in U.S. application Ser. No. 17/085,376.

The forms of observations above generally represent an estimate of geometric and/or material properties. Alternatively, underlying measurement from a sensor are provided as observations rather than such an estimate derived from the underlying measurements. For example, in the case of use of Optical Coherence Tomography (OCT) for sensing surface geometry, rather than estimating the surface location based on a peak in the coherence signal (e.g., a peak in the Fourier Transform of an interference signal of a spectrally dispersed signal) to yield a height estimate of the object, samples of the interference signal or its Fourier transform are provided for each location of the object, thereby permitting the controller to incorporate the inherent uncertainty of the height measurement in its control policy.

As another example, when using laser profilometry in which an imaging sensor (e.g., a camera) detects illumination of an object by a swept laser (e.g., an illumination plane) and thereby determines a height of an object based on the peak illumination, samples of intensity from the imaging sensor (e.g., at multiple pixel locations) are included in the observation.

As another example, when determining the material that was deposited on a top layer of an object based on different spectral characteristics of emission (e.g., scattering or fluorescence of the material or additives in the material) rather than explicitly accounting for the reflection properties that depend not only on the material of the top layer but also the material below the top layer, the observation provides the spectral measurements made at each location are provided directly, and the controller may incorporate a history of such measurements in its control policy.

In some embodiments, the observations can include measurements of the jetting process itself, for example, using cameras that observe the emitted material droplets. For example, observed drop size, shape, or location at a particular time after ejection, may provide yet other feedback as a function of location. For example, such measurements may provide implicit feedback of material properties such as viscosity or surface tension, or ejection characteristics such as velocity, which the controller can incorporate in its policy.

The observation may also include more global measurements, such as an ambient temperature of the printer environment, temperature of specific printheads, age or time since last cleaning of the printheads, and the like.

1.3 Control Policy Framework

The controller implements a policy that maps the inputs received by the controller to an output action that it provides as the control input to the printing system 130 introduced above with reference to FIG. 1. At least conceptually, after $t-1$ increments (i.e., layers) have been deposited in partial fabrication of the object and the scanner has provided feedback as a result of depositing that layer, the controller has available to it the reference $m^{ref}$ specifying the model of the object to be fabricated, as well as the entire history of observations $o_1, o_2, \ldots, o_t$ received from the printing system and the entire history of actions $a_1, a_2, \ldots, a_{t-1}$ that have been issued to the printing system by the controller.

In practice, the controller makes use of a summary of the available information at time t when making a determination of what the next action should be. The nature of this summary may differ from embodiment to embodiment described below. In at least some examples, this summary is represented as a "state" of the system $s_t$ at time t (i.e., after issuance of the action $a_{t-1}$ to the system and its acting of that action as the control input for the $t-1$ increment, changing the state of the system. The state forms a sequence $s_0, s_1, \ldots, s_t$, which in at least some examples forms a Markov Chain, which has the property that $s_t$ completely summarizes the history up to time t (i.e., the time just prior to issuing the action $a_t$ for the $t^{th}$ layer and no additional information from that history would yield a different (i.e., better) selected action by the controller. In some embodiments, the controller cannot make a definitive determination of the state of the system, for example, because of inherent uncertainties in the measurements provided by the system. In embodiments described below that explicitly account for such uncertainties, the controller cannot determine (i.e., observe) the state $s_t$ on which to decide the action $a_t$. That is, the true state is "hidden." Instead, the controller can rely on a "belief" $b_t$ of that state. This belief can encode the known uncertainty of the state, for example, in the form of a probability distribution over the set of possible hidden state values.

By way of example, as used in at least some embodiments described below, one choice of a state $s_t$ of the system can be represented as the height map of the partially fabricated object in the form of an array of height values as a function of coordinates (e.g., cells) in the x×y plane, as well as the remaining part of the reference model, denoted $m_t^{ref}$ has not yet been fabricated, for example, defined by "slicing" the reference model at the height of the partially fabricated object and ignoring all that is below that slice. That is, use of this state definition inherently assumes that nothing but the height of the partially fabricated object can affect the future fabrication of the object.

In the discussion below, examples are described in terms of the height of the partially fabricated object, for example, based on a frame of reference corresponding to the model reference. Alternatively, as the partially fabricated object is lowered as successive increments are deposited on its top surface to maintain a desired separation of the jets and the top surface of the partially fabricated object, the height of the partially fabricated object and the remaining part of the reference model are represented in a reference frame that is fixed relative to the height of the jets. Therefore, the control policy is largely or completely insensitive to the actual height of the partially fabricated object and depends on what is left to fabricate, and characteristics of relatively recently added increments of the partially fabricated object. In some alternative embodiments, the amount to lower a partially fabricated object before starting a pass of depositing material is itself part of the action that is commanded for a layer.

In one example of a policy, the controller selects the action to result in depositing a planar layer of material on the object (i.e., yielding a planar top surface), with the selection of material for each cell being defined by the material along the slice at the bottom of the remaining part of the reference. That is, the control input can be in the form of a multichannel binary image with indicating which material (i.e., corresponding to a channel) to deposit at each location, for example, support material versus build material. Such a policy can be represented as a deterministic function of the state $a_t=\pi(s_t)$. This policy is similar to the approach described in U.S. Pat. No. 10,456,984.

As an example where the state may not be fully observable, as used in at least one embodiment described below, if the height of the partial fabrication is not necessarily known with certainty, a belief $b_t$ may incorporate a mean (i.e., and estimate) of the height at each location as well as a variance (i.e., a measure of uncertainty of the estimate).

The general formalism used below is to view the change of state as a result of applying an action as a random function, which may have a distribution that is a function of the previous state as well as the action applied in that state. This randomness may be represented as a conditional probability distribution $p(s_{t+1}|s_t,a_t)$. With this formalism, the controller may choose the action $a_t$ that yields the most desirable next state, or an expected value of some function of that next state (i.e., an averaging over possible next states weighting by the probabilities of arriving in that next state). For example, in the context of the state $s_t$ representing the height of the object after t−1 layers, and $a_t$ being the instruction for depositing the $t^{th}$ layer, the distribution $p(s_{t+1}|s_t,a_t)$ represents the variability of the next height based on which material is actually deposited in response to the commanded action $a_t$.

In some embodiments, the controller uses a model of the system, for example, a model that yields a distribution of the next state given the present state and the selected action. In one such embodiment described below in which the state $s_t$ represents the height of the partially fabricated object after having applied the first t−1 layers, the model represents a distribution of the achieved height for any chosen action $a_t$. For example, if $a_t$ represents which material to deposit at each location (cell) during the $t^{th}$ layer for example as one array for each material with indicators of the locations where that material is to be deposited. The model takes $a_t$ as well $s_t$ representing the height at each location prior to depositing the layer, and yields the distribution of the height at each location (e.g., a mean and variance of the height) resulting from the printing of a layer according to that action.

There are at least some embodiments in which the action $a_t$ is selected from a set of possible actions, for example, according to a distribution of such action. In such embodiments, rather than defining the action as a deterministic function of the state as $a_t=\pi(s_t)$, the policy defines a probability distribution over the actions that may be selected, represented as $\pi(a_t|s_t)$.

There are at least some embodiments in which the action $a_t$ is selected according to a "value" of the next state, $V(s_{t+1})$, or in the case that there is uncertainty in the next state, according to an expected value of the next state, denoted $E(v(s_{t+1}))$. The value may be a numerical quantity, and the algebraically greater that quantity, the more desirable (i.e., "better") that next state is.

In at least some embodiments, taking an action $a_t$ yields a "reward" $r_t$, which may be represented as a numerical quantity that is algebraically greater if the action is desirable or increases the desirability or expected desirability of the ultimate object being fabricated (e.g., because it has higher dimensional accuracy) and is algebraically smaller, for example, if it is undesirable or consumes a resource. As an example, a reward $r_t$ may represent a tradeoff between incremental dimensional accuracy of the object by virtue of depositing a layer (e.g., a positive contribution to the goal) and a time to completion of the fabrication (e.g., a negative contribution for thin layers that may require additional layers to complete the object, and therefore require additional fabrication time). In some embodiments, the reward is a function of the state (i.e., $s_{t+1}$ determines $r_{t+1}$, or a probability distribution of $r_t$) while in other embodiments, the reward is a function of the previous state and the action applied at the previous state (i.e., $s_t$ and $a_t$ together determines $r_{t+1}$ or its probability distribution). For example, if $s_{t+1}$ represents the surface height after issuing the action $a_t$ in state $s_t$, although the state may in some embodiments represent the incremental dimensional accuracy, the action $a_t$ may be required to represent the thickness (or at least the commanded thickness) of the layer that is deposited to achieve that height. In at least some embodiments, the value of a next state is related to the sequence of future rewards (e.g., a sum into the future, or a discounted sum into the future).

2 Dimensional Model Based Control

A number of embodiments can be used in a situation in which observations from the printing system represent surface height of the partially fabricated object, but do not necessarily provide information about what material is present at different locations and/or locations of material transitions.

Figure 2:
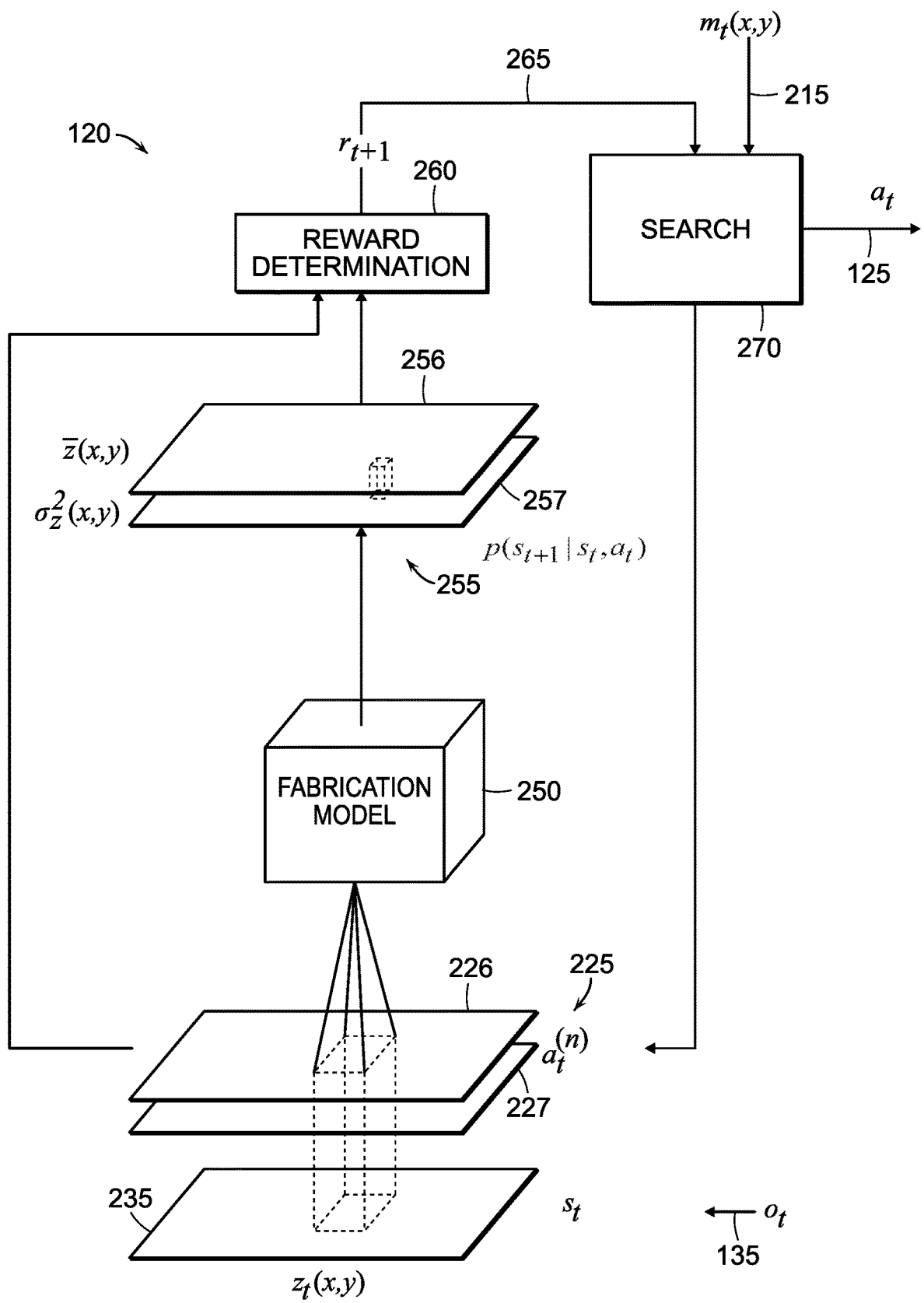
FIG. 2 is a block diagram of a controller that uses a fabrication model.

Referring to FIG. 2, a first such embodiment makes use of an observation $o_t$ 135 that represents an accurate measurement of the height of the partially fabricated object, denoted $z_t(x,t)$ 235, which acts as the state $s_t$. The control policy in this embodiment is based on a recognition that it is desirable to have as level a top surface of the object as possible after each layer is deposited, in particular with the top surface being as planar as possible and as parallel as possible to the xxy motion plane of the printing system. One reason that such a level surface is desirable is that it permits positioning the printheads very close to the object (e.g., by raising the build plate vertically toward the printheads), which may have desirable properties such as higher positional accuracy of the depositing of material, or increased consistency of material properties due to the short time that the material is "in flight" before it reaches the object during which the material may change properties (e.g., if the material is a curable polymer and an initiator to the curing is added in the printhead before jetting).

The absolute range of height over the surface provides one characterization of how level the top surface is, for example, the difference between the maximum height and the minimum height over the surface. Another characterization of how level the surface is the square root of an average squared deviation from a mid-height of the layer, average absolute deviation from a mid height or a top height of the surface, and the like. Because lower variation is desirable, the negative of such a characterization of variation is a suitable component of a reward. This component is denoted $r^{(level)}(s_{t+1})$.

Another factor that may be considered in selecting the action is the expected amount of material that will be deposited. For example, the final object has a fixed amount of material and therefore the amount of material deposited in a particular layer represents a factional degree of progress toward fabrication of the overall object. The more material that is deposited per layer, the fewer layers are needed, and therefore the fabrication time is reduced. In the case of binary control of jets, the expected amount of material may be based on the number of "on" cells for each material, possibly accounting for different volume per "drop" (i.e., controlled emission at a cell location). This component is denoted $r^{(material)}(a_t)$ below.

A weighted combination of the negative of a characterization of the variability of the height of the surface and the (positive) amount of material that is deposited is used as a reward $r_{t+1}$ (i.e., a characterization of the expected reward after acting on the command $a_t$). With the state representing the height of a surface, note that the reward depends on both the next state ($s_{t+1}$) via the variation in the achieved next height as well as on the action via the amount of material that is deposited in the layer yielding that next height.

In some examples, a model representing a change of state from a state $s_t$ to a state $s_{t+1}$ with an action $a_t$ makes use of a fabrication model 250, which in this embodiment is implemented using a neural network. The input to the neural network is an array of the measured height $z_t$ (x,y) at locations after depositing the first t−1 layers (i.e., $o_t$ 135), as well as a candidate commanded action $a_t^{(k)}$. 225, which includes the multiple channels 226-227 of jet instructions to deposit material at each of the locations. For example, if there are two materials, for every location in the xxy plane, there are three values that are input: the height before application of the $t^{th}$ layer, and the commanded indicator or amount for each of the materials. The output of the neural network 250 characterizes a distribution of the resulting height via an expected next height at each location $\bar{x}_{(x,y)}$, as well as a variance of the height at that location $\sigma_z^2(x,y)$. For each of these locations, this yields a probability distribution of height at that location (i.e., a distribution of one component of the next state). That is, there are two "channels" of output, with the dimension of the output being the same as the dimension of the input (i.e., each cell has one set of channels as input, and one set of channels as output).

One form of the neural network 250 for this model makes use of a convolutional neural network (CNN) using convolutional kernels with sizes that are commensurate with the physical effects that contribute to variation in height of a layer. For example, there are multiple (e.g., 5-7) such convolutional layers. For example, one physical effect is flow of uncured material, and the size of the kernel is at least as large as the distance that material may flow before it cures. For example, convolutional kernels in some embodiments have overall dimensions corresponding to in the order of 1-2 millimeter (e.g., in the order of 15-30 input "pixels").?

An example of a particular form of the neural network 250 processes $z_t$ and $a_t^{(k)}$ in separate convolutional sections, and the outputs of those convolutional sections are then combined (e.g., added, stacked) as an input to a third convolutional section that yields the output of the neural network 250.

The neural network 250 yields a distribution over the heights that are next achieved. For each such achieved height, the component of the reward related to the height variation (introduced as $r^{(level)}(s_{t+1})$ above) can be evaluated. One approach to computing the expected value of this component of the reward is to sample from the distributions of height according to the mean and variance at each location, for example, using a pseudo-random number generator, and for each sample, evaluating the reward. Another approach is to use an analytical approach, for example, assuming that the distribution of height at each location follows a Normal (Gaussian) distribution and evaluating the level-based reward analytically or using cumulative normal distribution tables or approximations.

In the embodiment shown in FIG. 2, the controller 120 implements a policy that chooses the best action $a_t$ that yields the best (i.e., algebraically largest) expected reward $r_{t+1}$ based on an iterative search over the possible actions and for each action, considers the resulting distribution of next heights. In this search, a search module 270 selects the material that is applied at each location based on the slice of the model $m^{ref}$ based on the measured height represented by $s_t$. The search module iterates (e.g., indexed by k) over possible inclusion or exclusion of particular cells in the layer in the case that there is only "on-off" control of jets yielding the possible control $a_t^{(k)}$. A variety of types of searches may be used, including a greedy search in which only improvements in the expected reward are retained, as well as searches that attempt to more reliably yield more globally optimal results (e.g., by not being trapped in local optima). In some implementations, the search is informed by a gradient in the reward, which may be computed using the neural network model. Ultimately, for example, based on convergence of the expected reward or some other stopping criterion, the search component 270 emits the selected action $a_t$ to instruct the system to deposit the next increment of material.

There are a number of variants of the embodiment illustrated in FIG. 2, for example, differing in the inputs to the model 250. In one variant, the state includes both the height after depositing of t−1 layers, as well as an indicator of the material at each location. In these embodiments in which the material is not observed by the scanning, the material that was instructed to be deposited at each location in the most recent printing pass is essentially used as a proxy. With this definition of state, the model takes as input additional channels $a_{t-1}$ to yield the mean and variance of the next height after depositing the layer according to $a_t$. One reason to include this additional information in the state is that certain combinations of materials interact in different ways (e.g., according to whether they are hydrophobic or hydrophilic), and this interaction can affect the flowing and mixing before curing. In variants in which there is control of the amount of material that is emitted, for example, by control of an excitation waveform for each jet, the search may be over the discrete set or range of parameters for such controls.

In another variant, the search can look ahead more than a single increment. For example, multiple applications of the model can take a possible sequence of z future actions, $a_t^{(k)}, \ldots, a_{t+\tau-1}^{(k)}$ can iteratively apply to the model to yield successive height distributions and corresponding rewards, and from that an accumulation (e.g., sum, discounted sum) of the rewards. Then next command $a_t$ is then selected as the first command from the τ step look ahead.

The approach illustrated in FIG. 2 uses a parameterized model 250, for example, with the parameters including the weights of convolutional kernels of the neural network. One way to determine values of these parameters is "offline" prior to fabricating an object using a training corpus that has corresponding inputs (i.e., $z_t$ and $a_t$) and resulting heights (i.e., $z_{t+1}$). In addition, "online" training can be used based on data collected during the fabrication of the object, for example, adapting a previously trained model to more closely match the fabrication conditions for the particular object being fabricated.

3 Control Policy

Figure 3:
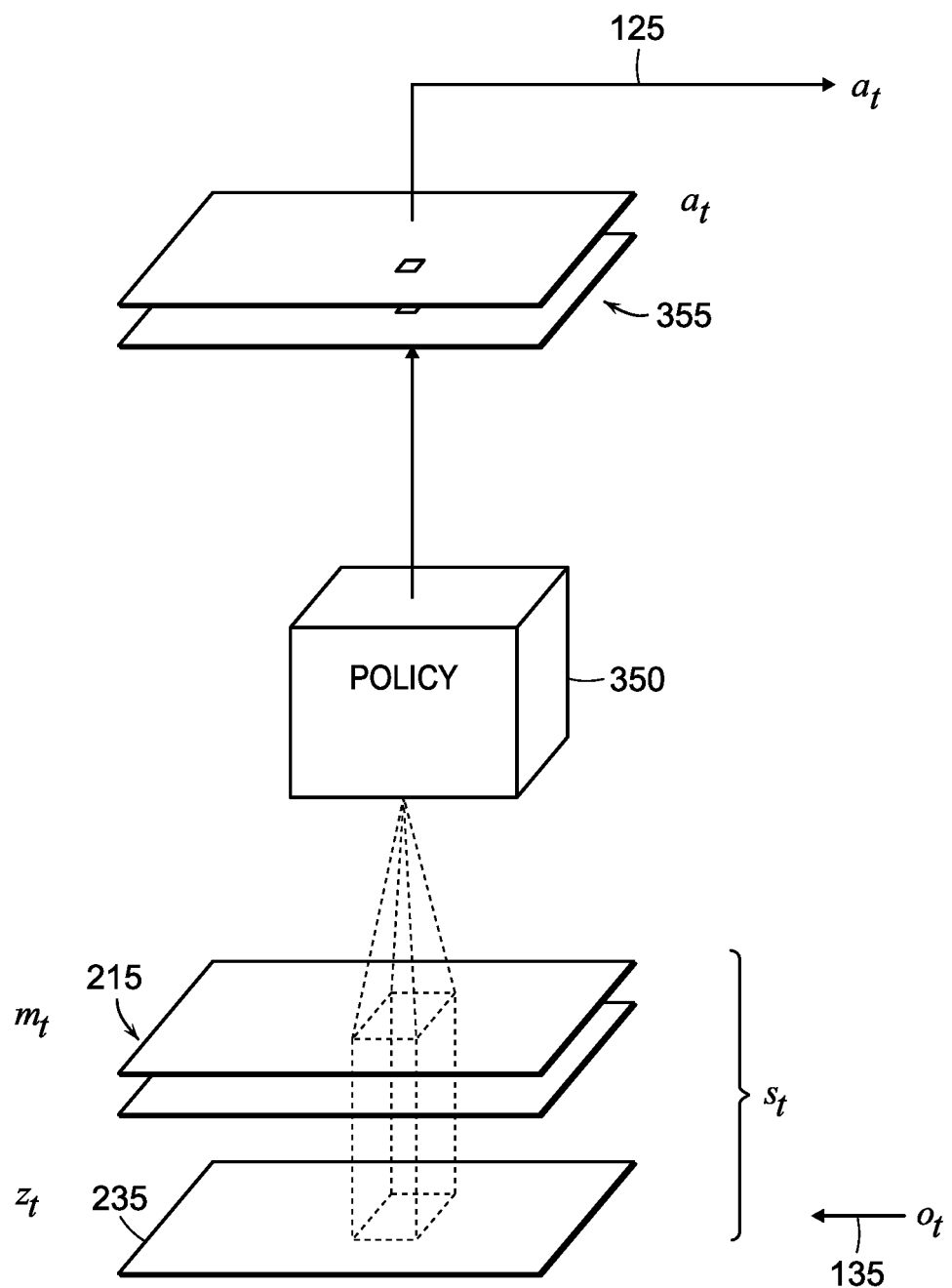
FIG. 3 is a block diagram of a controller that uses a policy model.

As may be recognized, the iterative search procedure illustrated in FIG. 2 may be somewhat computationally expensive. Referring to FIG. 3, an alternative is to determine a policy 350 that takes as input the measured heights $z_t$ 235 as well as the materials $m_t$ 215 to be deposited at that height based on the slicing of the reference model $m^{ref}$ 110 and to deterministically select the next action $a_t$ 355. Such a deterministic policy may be denoted $a_t=\pi(s_t)$, where the state $s_t$ includes both the measured height $z_t$ and the materials $m_t$ to deposit at that height in the model.

One way of determining the values of parameters characterizing the policy 350 is to use the results of applying the search procedure illustrated in FIG. 2. That is, the policy is designed to approximate the iterative search. As such, the policy depends on an estimate fabrication model 250. Therefore, the policy effectively attempts to provide as high a reward as possible (or accumulated reward in the case of using a multi-step lookahead) without the need to perform a search.

In a variant of the policy-based approach illustrated in FIG. 3, a "non-deterministic" policy may be used. In such a variant, the policy defines a conditional probability distribution $\pi(a_t|s_t)$, and the actual action with which the system is commanded is selected from that distribution. For example, the policy may be implemented as a convolutional neural network similar to the neural network 350 of FIG. 3 with an additional random input, for example, an additional input "channel" $\omega_t$ with an array of independently chosen pseudo-random values (e.g., as $a_t=\pi(s_t, \omega_t)$). Alternatively, a neural network can take $s_t$ and $a_t$ as input, and produce a scalar value as output representing the probability $\pi(a_t|s_t)$. One way of training such neural networks representing non-deterministic policies is to match values of actually achieved rewards in a training corpus.

4 Reinforcement Learning

A number of policy-based embodiments make use of parameterized deterministic or non-deterministic policies, for example, as shown in FIG. 3, with values of the parameters being determined using one of a variety of techniques within a class of techniques generally referred to as "Reinforcement Learning," for example as described in the textbook *Reinforcement Learning* by Sutton and Barto (MIT Press, 2020 Second Edition).

One such approach, in the context of the dimension-based control described above, uses a parameterized "value" function $V(s_t)$, which represents an estimate of the future rewards that may be accumulated starting at state $s_t$ and selecting actions $a_t, a_{t+1}, \ldots$ based on a policy implemented by the controller. That is, the value function depends on the policy. In the context of $s_t$ representing the surface geometry $z_t(x,y)$ as well as the remaining model of the object being fabricated, the value function represents the accumulation (e.g., summation or discounted summation) of the rewards that may be achieved. For example, this accumulation provides a tradeoff of the number of increments that need to be added and the "flatness" of the increments.

One policy that makes use of such a value estimate is to search for the action $a_t$ that yields the best (e.g., algebraically greatest) value of $V(s_{t+1})$. That is, in FIG. 2, the reward determination component 260 is replaced with a value determination component that outputs $V(s_{t+1})$ or the expectation of that value, rather than the next reward $r_{t+1}$ or its reward. In this way, an explicit multi-step lookahead is not required because the effect of the future rewards is incorporated into the value function.

The values of the parameters of the value function in some embodiments are determined, at least in part, based on the fabrication model. That is, a simulation of fabrication using the model, and the resulting rewards, is used to determine a value function that is consistent with that simulation. One particular way of updating the value function is to use an approach referred to as "temporal different learning." The basis of such learning is the observation that the difference between the value functions $V(s_t)$ and $V(s_{t+1})$ should reflect the actual reward $r_{t+1}$ resulting from the policy that determines the action $a_t$ based on the state $s_t$. That is, in the case of discounting the future rewards by a factory per time step, updating of the values of the parameters of the value function strives to drive differences $(r_{t+1}+\gamma V(s_{t+1}))-V(s_t)$ to zero, for example, using a gradient updating procedure.

There are a number of reinforcement learning (RL) procedures that update values of parameters of a fabrication model, a policy, a value function, and/or various related functions (e.g., "Q" functions), based on a prior training corpus as well as observations that are collected online during fabrication. In one such approach, parameters of a fabrication model are estimated or updated during fabrication, thereby matching the particular conditions relevant to the fabrication of a particular object. This model is then used to update a policy (or related value function), for example, by simulation of fabrication scenarios using a Monte-Carlo simulation approach. Such updates may be used in conjunction with updates based on actual observations, either in the current object fabrication, or in a corpus from prior observations.

5 Feedback Information

Approaches described above focus on feedback of geometric properties such as surface height and use of smoothness of the surface as a being related to quality of the desired object that is fabricated, in at least some embodiments the quality of the object may be more directly determined from the observations. For example, when the observations provide material information in the form of a fractional composition or probability or presence of each material as a function of surface location, the reward can represent an incremental quality of the object achieved by each added increment.

As one example, overall quality of the object may be represented to be highest if the outer surface of the desired object (e.g., the boundary between support material and build material) matches the target shape of that surface in the reference model. One way to define a reward that incorporates such quality introducing a component of the reward that when accumulated over increments provides an average or sum (e.g., integral) of deviation of the location of the transitions (e.g., the outer surface of the desired object formed inside the support material) as compared to the reference model. As another example, a smoothness of the outer surface may be used as an alternative or additional term in the reward such that rapid changes in the transition location between materials from increment to increment are penalized because they correspond to a rough surface.

Other material-related terms may be added to the reward function, for example, related to internal material transitions or fractional compositions within the desired object, for example, between different build materials.

Note that when using the surface accuracy or smoothness of the ultimately fabricated desired object, it may not be necessary to include a term in the reward corresponding to the planar nature of the top surface of the object. For example, exploration of fabrication policies may include intentionally depositing non-planar increments may yield a policy that intentionally yields such non-planar increments. For example, exploration of fabrication policies may include depositing non-uniform material layers (e.g., depositing a thicker layer in a bulk of an object as compared to depositing thin layers near fine features) and depositing one material in advance of another material near material transitions (e.g., depositing support material that hardens in advance of depositing build material that flows to the support material in a subsequent layer). Using the reinforcement learning formulation and a well-estimated fabrication model, a wide variety of fabrication policies may be explored in simulation, thereby discovering fabrication policies that may not have been anticipated by human design and that may be particularly tailored for materials and combinations of materials used in fabrication of an object.

6 Alternative Techniques

A wide range of Reinforcement Learning (RL) approaches may be used in conjunction with the techniques described above, including model-based (also referred to as "model learning") and model-free (also referred to as "direct") techniques. Also, a combination of updating a model of the printing process as well as updating a policy for controlling the printing process in what may be referred to a "Dyna" architecture may be used. Such an approach may be robust to changes in the printing process, for example, because of variations in the printing materials, and physical changes that might affect calibration. Such approaches may improve with experience, and in the case of techniques with models of the printing process, may improve with simulated experience which examine a wide range of policies for controlling the printer.

Note that rather than using processed versions of scan data in which height and/or material is explicitly represented, raw measurements, such as images from a laser profilometer or interference signals from a optical coherence tomography based scanner are provided as input and color and intensity data from scanning of materials (e.g., which may have different additives to yield different colors during scanning), for example, as input to a policy. In such approaches, uncertainty in height estimates is essentially incorporated in the internals of the policy evaluation component. Similarly, aggregation of multiple scans (e.g., from successive layers) is the effectively incorporated into the policy evaluation.

7 Implementations

Implementations of the controller may use a hardware processor that executes instructions, which are stored on a non-transitory machine-readable medium. For example, the processor may be a general-purpose processor, or a special-purpose processor for instance a graphics processing unit (GPU). Some implementations may use circuitry such as application-specific integrated circuits (e.g., ASICs) and/or field programmed circuitry (e.g., FPGAs) in addition or instead of hardware processors.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for fabricating a 3D object having an object specification via a printer, the method comprising:
    receiving sensor data characterizing a first partial fabrication of the 3D object;
    determining printer commands for causing the printer to fabricate a first incremental portion of the 3D object on the first partial fabrication of the 3D object, the determining depending on a simulation of a printing process, the sensor data, and the object specification; and
    causing the printer to fabricate the first incremental portion of the 3D object of the first partial fabrication according to the printing process using the printer commands to yield a second partial fabrication.

2. The method of claim 1, wherein the printer commands represent instructions for depositing at least one of a material and an amount of a material at each location of a plurality of locations on a surface of the first partial fabrication of the 3D object.

3. The method of claim 1, wherein the simulated printing process comprises an artificial neural network.

4. The method of claim 3, wherein the artificial neural network comprises a convolutional neural network representing a physical phenomenon of the printing process.

5. The method of claim 3, further comprising, after the printer fabricates the first incremental portion, and after receiving sensor data characterizing the second partial fabrication of the 3D object, updating the artificial neural network based on said sensor data.

6. The method of claim 1, wherein the determining of the printer commands comprises simulating fabrication of an incremental portion of the 3D object according to a plurality of candidate printer commands, and selecting the printer commands for the first incremental portion from the candidate printer commands.

7. The method of claim 6, wherein the determining of the printer commands comprises simulating fabrication of sequences of multiple incremental portions of the 3D object according to a plurality of candidate sequences of printer commands, and selecting the printer commands for the first incremental portion from one of the candidate printer commands.

8. The method of claim 6, wherein the determining of the printer commands comprises determining a corresponding reward value resulting from each simulating fabrication of an incremental portion of the 3D object according to a plurality of candidate printer commands, and selecting the printer commands for the first incremental portion according to the determined rewards.

9. The method of claim 6, wherein the simulating of the fabricating of the incremental portion according to candidate printer commands comprises processing the candidate printer commands using an artificial neural network.

10. The method of claim 9, wherein the candidate printer commands comprise an array of jet commands for printing locations on the 3D object.

11. The method of claim 9, wherein the processing of the candidate printer commands comprises processing the printer commands in combination with data determined from the sensor data.

12. The method of claim 11, wherein the data determined from the sensor data comprises surface geometry data.

13. The method of claim 9, wherein an output of the artificial neural network represents a surface geometry resulting from the simulated fabrication of the first portion.

14. The method of claim 1, wherein the determining of the printer commands for causing the printer to fabricate a first incremental portion comprises processing data that depends on the sensor data and data that depends on the object specification using a policy to yield the printer commands for the first incremental portion of the 3D object.

15. The method of claim 14, wherein the policy comprises a second artificial neural network.

16. The method of claim 15, further comprising updating the second artificial neural network comprises updating said network using at least one of data determined from sensor data received characterizing the object after fabrication of the first incremental portion and data determined from the simulation of the printing process.

17. The method of claim 14, further comprising using a Reinforcement Learning procedure to update at least one of the simulation of the printing process and the policy for yielding printing commands.

18. A method for fabricating a 3D object having an object specification via a printer, the method comprising:
  maintaining configuration data for a policy for processing an input depending on sensor data characterizing a partial fabrication of the object and input depending on the object specification to yield printer commands;
  receiving sensor data characterizing a first partial fabrication of the 3D object;
  determining printer commands for causing the printer to fabricate a first incremental portion of the 3D object on the first partial fabrication of the 3D object, the determining using the policy with inputs comprising an input depending on sensor data characterizing the first partial fabrication of the object and an input depending on the object specification; and
  causing the printer to fabricate the first incremental portion of the 3D object of the first partial fabrication according to the printing process using the printer commands to yield a second partial fabrication;
  wherein the maintaining of the configuration data includes updating the configuration data for the policy based on at least one of a simulation of the printing process and sensor data characterizing the second partial fabrication of the object.

19. The method of claim 18, wherein updating the configuration data for the policy comprises using a Reinforcement Learning procedure.

20. The method of claim 18, wherein at least one of the policy and the simulation of the printing process are implemented using an artificial neural network.

* * * * *